(12) United States Patent
Miller

(10) Patent No.: US 6,216,469 B1
(45) Date of Patent: Apr. 17, 2001

(54) DEVICE AND PROCESS FOR CHILLING GOODS

(75) Inventor: Bruce Miller, 2300 S. High St., Denver, CO (US) 80210

(73) Assignee: Bruce Miller, Denver, CO (US)

( * ) Notice: Subject to any disclaimer, the term of this patent is extended or adjusted under 35 U.S.C. 154(b) by 0 days.

(21) Appl. No.: 09/334,214

(22) Filed: Jun. 15, 1999

Related U.S. Application Data

(60) Provisional application No. 60/089,331, filed on Jun. 15, 1998.

(51) Int. Cl.[7] ............................ F25D 3/00; F25D 17/02; F28F 1/32; F25C 1/00
(52) U.S. Cl. ............................ 62/59; 62/64; 62/135; 62/373; 62/434; 165/171
(58) Field of Search .............................. 62/59, 64, 139, 62/373, 376, 430, 434, 435, 438; 165/157, 170, 171, DIG. 342, DIG. 348, DIG. 480

(56) References Cited

U.S. PATENT DOCUMENTS

| | | | | |
|---|---|---|---|---|
| 2,102,171 | * | 12/1937 | Vandoren | 62/430 |
| 2,155,299 | | 4/1939 | Bruce | 62/389 |
| 2,632,308 | * | 3/1953 | Engelhardt | 62/139 |
| 2,638,754 | * | 5/1953 | Kleist | 62/430 |
| 4,356,708 | * | 11/1982 | Horton | 62/430 |
| 4,656,836 | | 4/1987 | Gilbertson | 62/185 |
| 4,840,033 | * | 6/1989 | Garland | 62/59 |
| 4,928,493 | | 5/1990 | Gilbertson et al. | 62/185 |
| 4,939,908 | | 7/1990 | Ewing et al. | 62/139 |
| 5,168,724 | | 12/1992 | Gilbertson et al. | 62/430 |
| 5,222,367 | * | 6/1993 | Yamada | 62/64 |
| 5,381,670 | * | 1/1995 | Tippmann et al. | 62/330 |
| 5,423,191 | * | 6/1995 | Bennett | 62/201 |
| 5,941,091 | * | 8/1999 | Broadbent | 62/347 |

* cited by examiner

*Primary Examiner*—William Doerrler
(74) *Attorney, Agent, or Firm*—Greenlee, Winner & Sullivan, P.C.

(57) ABSTRACT

Devices and methods for rapid chilling of products, articles and devices, including both perishable and non-perishable goods are provided. These devices and methods store thermal energy by ice and/or slush formation and employ the heat of the product to be chilled to help harvest the ice. Devices provided by this invention have a chill tank containing a freezable chilling agent; a source of refrigerant; and one or more thermally-conductive layers in the tank which are in contact with the freezable chilling agent and which have a working surface thermally coupled with the refrigerant source and a heat-absorbing surface thermally coupled with the working surface, wherein selective introduction of a flow of refrigerant closely thermally coupled with the working surface chills the working surface, the chilling agent in the tank and any product in the tank and permits chilling agent to freeze on the working surface and wherein the refrigerant source, the working surface and the heat-absorbing surface are arranged with respect to each other and the refrigerant is selectively applied so that chilling agent does not freeze to the heat-absorbing surface.

21 Claims, 4 Drawing Sheets

DEVICE AND PROCESS FOR CHILLING GOODS

CROSS-REFERENCE TO RELATED APPLICATIONS

This application takes priority under 35 U.S.C. § 119(e) to U.S. provisional application Ser. No. 60/089,331, filed Jun. 15, 1998 which is incorporated in its entirety by reference herein.

FIELD OF THE INVENTION

The present invention relates to devices and processes for cooling objects in a tank containing a chilled agent, and more particularly to those for quick chilling products such as perishable food and medical products.

BACKGROUND OF THE INVENTION

A number of different systems and methods for quickly chilling food, beverages, and other goods are in commercial use today. Chilling devices include those with refrigerant coils which directly chill liquid water to a set temperature which is then circulated in a tank to chill product, ice builders which harvest ice to chill water which is then pumped into a separate chill tank; slush ice builders where the slush formed is pumped into a separate chill tank; antifreeze systems using chilling agents such as brines, glycols or eutectic salts in a direct chill system; and air chill systems where the product is either chilled or frozen by contact with high-volume cold air.

Chilling or cooling systems using antifreeze, eutectics, brines, glycol and other additives have inherent sanitation and corrosion problems. Use of such additives which may be toxic is inappropriate for direct contact with food products. Disposal of tank fluids containing such chemicals can also create environmental problems and additional expense for proper disposal.

Thermal energy storage (or cool storage) is a process by which heat is extracted from a thermal reservoir (e.g., a chilling agent, such as water, to form frozen chilling agent or a slurry of frozen and liquid chilling agent, such as ice or slush) at one time, and at a later time to use the thermal reservoir (e.g., the ice or slush) to extract heat from an environment. Ice-building and harvesting systems are used to provide chilled water for air conditioning of buildings. Ice is built on refrigerator coils and later harvested into a separate storage tank to chill water that is then available for cooling. A significant benefit of such systems is their use of off-period ice building to reduce power costs. Typically, ice harvesting is done in these systems by application of external mechanically or thermal energy decreasing the overall efficiency of the cooling process. Exemplary systems using thermal energy storage for building air conditioning are discussed in U.S. Pat. Nos. 4,656,836; 4,928,493; and 5,168,724.

External ice builders (e.g., not within the chill tank) with heat exchangers are in common use in food manufacture and commissary kitchens. Ice is built on refrigerator coils and harvested to chill water. External energy is most often added to harvest the ice. In many applications, water chilled in the external ice builder is pumped at high volume into a chill tank containing product to be chilled. The product may be contained in bags or similar individual container which may be tumbled or agitated mechanically to speed chilling. Tumblers are expensive to build and can be dangerous for those personnel who operate, clean, load and unload them. Chill times can be relatively long in such systems (up to several hours) at least in part because the temperature of the near-freezing water in the ice builder is typically several degrees higher in temperature after it is transferred to the chill tank for cooling the product. Furthermore, the capacity of chilled water to remove heat with concomitant temperature rise is only a small fraction of that of an equal volume of ice to remove heat with concomitant melting of the ice. Additionally, while refrigeration units are typically light enough to be placed on the roof of a building to conserve floor space, ice builders with a water/ice storage tanks are generally too heavy to put on a roof of a building and thus can require allocation of more floor space or ground space than a chill tank alone. Further, it is more efficient and less costly to run refrigerant supply and return lines than it is to run supply and return lines for high volumes of liquid chilling agent or slush. The distance that chilling agent or slush is transported is a limiting factor on system efficiency.

In slush ice chilling systems, slush ice is made in a separate tank and either scraped off mechanically or removed by running high-pressure water through polished large diameter tubes and then transported to a chill tank. Slush ice systems consume energy in harvesting and transferring the slush ice to chill the product. Solid ice is generally preferred to slush for storage of cooling thermal energy, because slush ice has a significantly lower latent heat of fusion than an equal volume of solid ice.

All of these systems for chilling goods introduce energy needlessly, waste space, or create other avoidable expenses. The present invention is directed to a quick chilling device that employs thermal energy storage to improve chilling efficiency and speed, but avoids additional energy input to harvest ice or slush.

SUMMARY OF THE INVENTION

The present invention provides devices and methods for rapid chilling of various products, articles and devices, including both perishable and non-perishable goods. In preferred, embodiments the invention relates to rapid chilling of products that include, among others, foodstuffs, medicinals, blood products, and other perishable goods. Embodiments of this invention include rapid chilling devices for products which are detrimentally affected by freezing. These devices and methods store thermal energy by ice and/or slush formation and employ the heat of the product to be chilled to perform useful work, i.e., to help harvest the ice. Solid ice harvesting generally occurs any time a warm or hot product is introduced into the device of this invention. Harvesting allows a higher volume of the water to freeze, expands cooling capacity and generally accelerates cooling by enhancing the thermal and radiative conduction between the liquid chilling agent and the working surface and the refrigerant and the chilling agent. Congested facilities (e.g., restaurants, hospitals, or blood banks) needing high-volume chilling of a perishable product will benefit especially from the present invention. The combination of the chilling device of this invention with a remote refrigeration unit, e.g., a refrigeration compressor on the building roof, results in a particularly space-efficient quick chilling device.

The devices and methods of this invention which typically cool with a mixture of liquid and frozen chilling agent (water and ice) provide more rapid chilling than conventional quick chill devices that cool with chilled liquid chilling agent alone.

More generally, the inventive chilling devices have a chill tank containing a freezable liquid chilling agent (preferably water and more preferably potable water) for thermal storage and transfer, a heat exchanger, comprising a thermally conductive layer, submerged, surrounded and in contact with the liquid chilling agent, a selectively controlled source of refrigerant to the heat exchanger, and a control system for controlling the introduction of refrigerant into the heat exchangers. Warm or hot product is directly inserted into the chill tank in contact with the liquid chilling agent. Refrigerant provided by any standard refrigeration unit or plant to the heat exchanger chills the liquid chilling agent and ultimately a mass of frozen chilling agent forms on surfaces of the heat exchanger. The heat exchanger surface at which the frozen layer forms is designated the working surface. An important feature of this invention is that the heat exchanger comprises two surfaces: a working surface for building frozen coolant and a heat-absorbing surface which always remains free of frozen chilling agent (e.g., that remain ice-free). The working surface is substantially in direct thermal and/or close radiative contact with the refrigerant and the heat-absorbing surface is, in turn, in direct thermal and/or close radiative contact with the working surface, but is only indirectly in thermal and radiative contact with the refrigerant. The heat-absorbing surface is kept free of frozen chilling agent to facilitate absorption of heat generated by added warm or hot product. Frozen chilling agent is confined to the working surface by a control system responsive to the thickness of the frozen mass or responsive simply to the ice/water temperature at a set distance away from the working surface. When the frozen mass reaches a maximum thickness or the temperature reaches a first set point associated with achieving the maximum amount or thickness of frozen chilling agent, the refrigerant is shut off. Refrigerant is turned on again when the temperature reaches a second set point associated with a selected maximum temperature or associated with ice harvesting (the release of frozen mass from the heat-exchanger).

In the inventive system there is no need for application of external energy to harvest the frozen mass from the working surface. Warm or hot product added to the chill tank transfers heat to the system to harvest or release the ice from the working surface. It is believed that the provision of a thermally conductive heat-absorbing surface on a heat exchanger facilitates heat transfer from the product to facilitate frozen mass release from the working surface. It is presently believed that the different rates of linear expansion of the working surface and the frozen mass with changing temperature facilitate frozen mass release. Harvesting is also facilitated by use of heat exchangers wherein the working surface is smooth or otherwise treated to minimize adhesion of the frozen mass.

The devices of this invention are designed to obtain an improved rate of heat exchange (an improved speed of chilling a given product) by increasing where possible and practical the temperature differentials (ΔT) between product to be cooled, chilling agent and refrigerant.

Heat energy is transferred from added warm or hot product to the heat exchanger by any mechanism including conduction, convection or radiative transfer. To facilitate radiative heat transfer, added product is preferably positioned with respect to the heat exchanger heat-absorbing surface to maximize radiative transfer. One or more reflective panels are optionally positioned in the chill tank to direct radiative emissions from the product towards the heat exchanger. The inside wall (or parts thereof) of the chill tank can be made of shiny, smooth metal to direct radiative emissions to the heat exchanger. Furthermore, the heat-absorbing surface of the heat exchanger, can be coated with a substance that enhances radiative absorption (e.g., a black coating). A preferred coating is durable and can be readily cleaned. Chilling agent is preferably selected to be at least as transparent to infrared light as pure water. To minimize intervening absorption and maximize radiative absorption to the heat exchanger, product is positioned as close as practical to the heat exchanger surfaces, preferably the product is positioned up to 12 inches from the heat exchanger surfaces. The positioning and spacing of heat exchangers in the chill tank can be optimized dependent upon the size and shape of product to be chilled to maximize radiative transfer. For example, product can be positioned adjacent to or between heat exchangers with vertically aligned surfaces (as illustrated in FIG. 1) and product can be positioned above or below heat exchangers with horizontally aligned surfaces.

Preferred heat exchangers of the device of this invention have highly thermally conductive layers. Preferred heat exchangers are plate coils comprising highly thermally conductive layers in thermal contact with one or more conduits for carrying refrigerant for chilling the layers, the chilling agent and the product. The plate coils can for example be rectilinear metal elements with length and width significantly larger than its thickness in contact with a refrigerant coil. The working surface and the heat-absorbing surface are formed on both the front and back surfaces of the plate coil. The surface of the plate in direct contact with the refrigerant coils, e.g. proximal to the coils, and extending a selected distance from the coil, is the working surface on which frozen chilling agent is built. The thickness of the frozen mass and the size of the working surface is selected for a given application and need for cooling capacity. The heat-absorbing surface of the plate is the surface area of the plate that is distal from the coils, e.g. extending between working surfaces and at the perimeter of the plate, that is free of frozen mass to facilitate heat absorption. In a preferred embodiment, a refrigerant coil can form a serpentine pattern in the plate, with the refrigerant inlet and exit at opposite edges of the plate (i.e., bottom and top, respectively, in vertically aligned plates). The refrigerant coil can be a separate element permanently bonded or welded to the plate or the coil may be integral with the plate, i.e., formed by two plate layers having aligned indentations to form the coil channel in the plate.

In certain embodiments of this invention, the chilling agent is liquid and the solid frozen mass (used for thermal energy storage) is built and harvested. In this case, the chill tank can contain a mixture of solid frozen mass and liquid (e.g., solid ice and chilled water). Alternatively, by appropriate adjustment of the lower temperature set point of the controller (see below), slush ice can be formed in the chill tank (i.e., slush is solid frozen mass saturated with liquid chilling agent and is most often used to describe solid ice saturated with water). In this case, the chill tank contains a mixture of slush ice and solid ice. If slush ice formation is desired care must be exercised to avoid catastrophic freezing of the chill tank and when using a circulation pump to avoid pump failure which can lead to catastrophic freezing. The amount of slush ice in the chill tank can be assessed and controlled using a variety of measurement: e.g., density, turbidity, or electrical resistance.

Preferred plate coils are formed from stainless steel. Preferred plate coils are electro polished at least at the working surfaces to facilitate release of frozen chilling agent.

The device is optionally provided with a circulation system for circulating chilling agent within the chill tank.

Circulation can be facilitated by use of an agitator or stirrer. Alternatively or in addition, liquid chilling agent can be circulated using an efficient liquid pumping system. The device is optionally provided with a agitation system for moving or circulating product in the chill tank. Agitation of the product can also facilitate circulation of the chilling agent. For example, a product roller or tumbler can be inserted at least partially into the chill tank. Product to be chilled is added to roller or tumbler, which revolves or otherwise moves (e.g., shakes or translates back and forth or translates up and down) to move product in the chill tank and to move product within individual packages.

Many perishables can be damaged when water in them freezes, so a preferred embodiment comprises a chilling agent with a freezing temperature near 0° C., typically water.

The product added to the chill tank can be packaged in appropriate containers, for example in sealed plastic bags or plastic bottles or boxes. Product packaging preferably is resistant to the effects of submersion or partial submersion in chilling agent (e.g., water). Glass containers or bottles can be employed if care is taken to avoid breakage. Metal containers, tubes, cans or mesh baskets and similar containers can also be employed. The chill tank can be provided with shelves, compartments or like product holders. These holders can be positioned selectively in the chill tank with respect to heat exchanger surfaces to facilitate heat transfer from warm or hot products to the heat exchanger. In a specific embodiment, stainless steel mesh is provided for product placement above heat exchangers. Product holders can be made of stainless steel, aluminum, or other material having high thermal conductivity, strength, and/or corrosion resistance. Product can be suspended into (e.g., on a hook or in netting) and moved through the chill tank in the vicinity (e.g., adjacent, in between, above or below) of the heat exchangers. Product can also be placed on a conveyor belt, on a track, on rollers or on a similar product mover and transported through the chill tank in contact with chilling agent and in the vicinity (e.g., adjacent, in between, above, or below) the heat exchangers. A fluid or semi-fluid product, e.g., a beverage, cream or a sauce, can be inserted into the chill tank by passage or flow through a product tube (preferably a metal tube) at least a portion of which is submerged in the chilling agent in the chill tank. A product tube can also be employed with a variety of food products including whole vegetables or fruit (e.g., green beans), chopped or mashed vegetables or fruit, eggs, milk, etc.). Product can be pumped, forced, or otherwise impelled through the tube. Product entering the tube is warm or hot and product exiting the tube is appropriately chilled. Fluid goods may use a draft tube such as that depicted in U.S. Pat. No. 2,155,399. Systems for chilling larger goods, such as whole turkeys, desirably incorporate an agitator or circulation pump, and use a shelf or container of metal mesh or a screen through which the chilling agent can readily circulate to position product in the chill tank. Any shelving, containers or other product holders, including product tube are optionally removable from or repositionable in the chill tank, such as by a hinge or latch, to facilitate cleaning the tank. Preferably the tank, plate coils, and any product holds are constructed from materials that can be readily and efficiently cleaned by power washing.

Product can be manually inserted into and removed from the chill tank. In typical operation, the refrigeration unit is activated and the refrigerant is admitted to the device to chill the chilling agent, and begin frozen mass formation. Warm or hot product can in general be introduced into the device at any time, however, the speed of chilling and the capacity for rapidly chilling larger amounts of product is improved when frozen mass at or near maximal thickness has formed on the working surface and a supply of frozen mass has been released into the chill tank. The chilling capacity of the device can be varied, for example to accommodate smaller or larger amounts of product, by adjusting the maximum thickness of frozen mass that is allowed to form (e.g., adjusting the amount of working surface on the heat exchanger) and by building up solid ice or slush ice in the chill tank. Provision of proper chill tank insulation allows build up of cool storage. The device of this invention can also be adapted for the use of automated insertion and removal of product. A timing device and/or temperature sensor can be used to control deposit and/or removal of the product, for example using a robotic arm or similar apparatus.

Product is preferably placed in the chill tank at a location with respect to the heat exchangers (plate coils) that allows radiative heat transfer from the product to the heat exchangers to facilitate harvest of frozen chilling agent. Product can be selectively located by placement of a product vessel or by placement of product holders in the chill tank. Product can be placed adjacent to, in between, above or under heat-absorbing and working surfaces of the heat exchanger to transfer heat energy thereto. Heat exchangers, particularly plate coils can be selectively positioned to maximize radiative transfer from the product or to provide for efficient product loading. Plate coils may be vertically or horizontally aligned. Plate coils may be sufficiently separated to allow product to be inserted between two plate coils. A plurality of plate coils may be aligned and positioned at the top of the chill tank and product inserted through appropriate side access into the bottom of the tank. Alternatively, a plurality of plate coils may be aligned and positioned at the bottom of the chill tank and product inserted in the top of the tank above the plate coils.

In an alternative embodiment, the plate coil forms at least a portion of the product container or product vessel. For example, the plate coil can be formed into a product tube to be submerged in a chill tank. Refrigerant coils are on the outer surface of the tube which comprises the working surface and the heat-absorbing surface. The tube is submerged in chilling agent in a chill tank and when refrigerant flows into the coils, product, tube and chilling agent are chilled and a frozen mass of chilling agent forms on the working surface. In this case, product is pumped, forced or otherwise impelled through the tube and product is appropriately chilled without undesirable freezing as it passes through the tube.

The present invention desirably incorporates a control system that detects ice thickness or some other measurable property related to the size/amount of chilling agent that has been frozen (e.g., temperature, transmission of light, or electrical resistance). Such a system controls the refrigerant flow in response to this measurement, so that excessive buildup of frozen chilling agent is avoided. For example, a temperature sensor positioned a selected distance (d1) from the working surface, which will be encased in the frozen mass during frozen mass building, and released into liquid chilling agent when the frozen mass is harvested can be used to provide for refrigerant on/off control. More simply, the temperature sensor can be set to turn off the refrigerant at a selected low temperature and to turn it on at a selected high temperature. Desirably, the device of this invention features redundant override means for deactivating the refrigeration unit to avoid coolant freezing so excessive as to cause component damage (i.e., "catastrophic freezing").

Other features, variations, and advantages of the present invention will become apparent to one of skill in the refrigeration trade by reference to the drawings and descriptions below.

BRIEF DESCRIPTION OF THE DRAWINGS

FIG. 2A is a perspective view with cut-away end of a vertical, stainless steel plate coil of the chilling system of FIG. 1 indicating the working surfaces and heat-absorbing surfaces of the plate coil and showing the location of various control sensors on or near the plate coil. FIG. 2B is side view of the plate coil of FIG. 2A illustrating the positioning of control sensors at or near the plate coil surface. FIGS. 2C, 2D and 2E illustrate alternative shapes of refrigerant lines of the plate coil.

DETAILED DESCRIPTION OF INVENTION EMBODIMENTS

A chilling agent as used in the present invention is a freezable liquid that functions either as liquid chilling agent, frozen chilling agent or slush for heat transfer from a solid or liquid product to chill the product. In the device of this invention, a product is fully or partially immersed in liquid chilling agent, either directly or within thermally conductive product packaging. In the device of this invention liquid chilling agent is frozen to solid frozen mass or slush to provide for thermal energy storage to function to chill product. The preferred chilling agent is water.

The term "refrigerant," takes its conventional meaning to refer to any material whose properties, particularly low vaporization temperature, make it suitable for use in refrigeration. In the device of this invention the refrigerant is a liquid which remains liquid down to relatively low temperature (down to −50° C. or lower) which is used for absorbing heat from the heat exchanger, chilling agent and product (e.g., from the surroundings). A refrigerant source can be refrigeration system or unit that provides liquid refrigerant which on expanding into the heat exchanger chills the surroundings. For example, liquid refrigerant delivered to the chilling device is expanded to substantially form a gas. Expansion requires energy which is absorbed from the surroundings thereby chilling the surroundings, including the chilling agent and product. The gas is returned to a compressor and condenser where heat is released to the surroundings to again provide liquid refrigerant for expansion. The system of this invention can employ any refrigerant appropriate for the chilling agent employed.

The product to be chilled may be a fluid (such as a beverage), a semi-solid (such as cream or sauce) or a solid (such as containers of just-cooked food). Product may be directly inserted into the chill tank or more preferably within suitable packaging, e.g., plastic, metal or glass boxes or bottles and plastic bags. Product can also be contained in a product vessel, which must be large enough to receive the intended product, and preferably conducts heat well, e.g., metal vessels. A product vessel can be a container typically made of a screen or mesh to allow the cross-passage of chilling agent. A vessel for unpackaged liquid products or packaged or unpackaged small products can be a tube which is fully or partially immersed in chilling agent. Product is not intended to be ice or slush (for use in beverages or in confections) produced in the chill tank. However, slush or ice produced during chilling of product may be employed as desired for other chilling applications.

Figure 1:
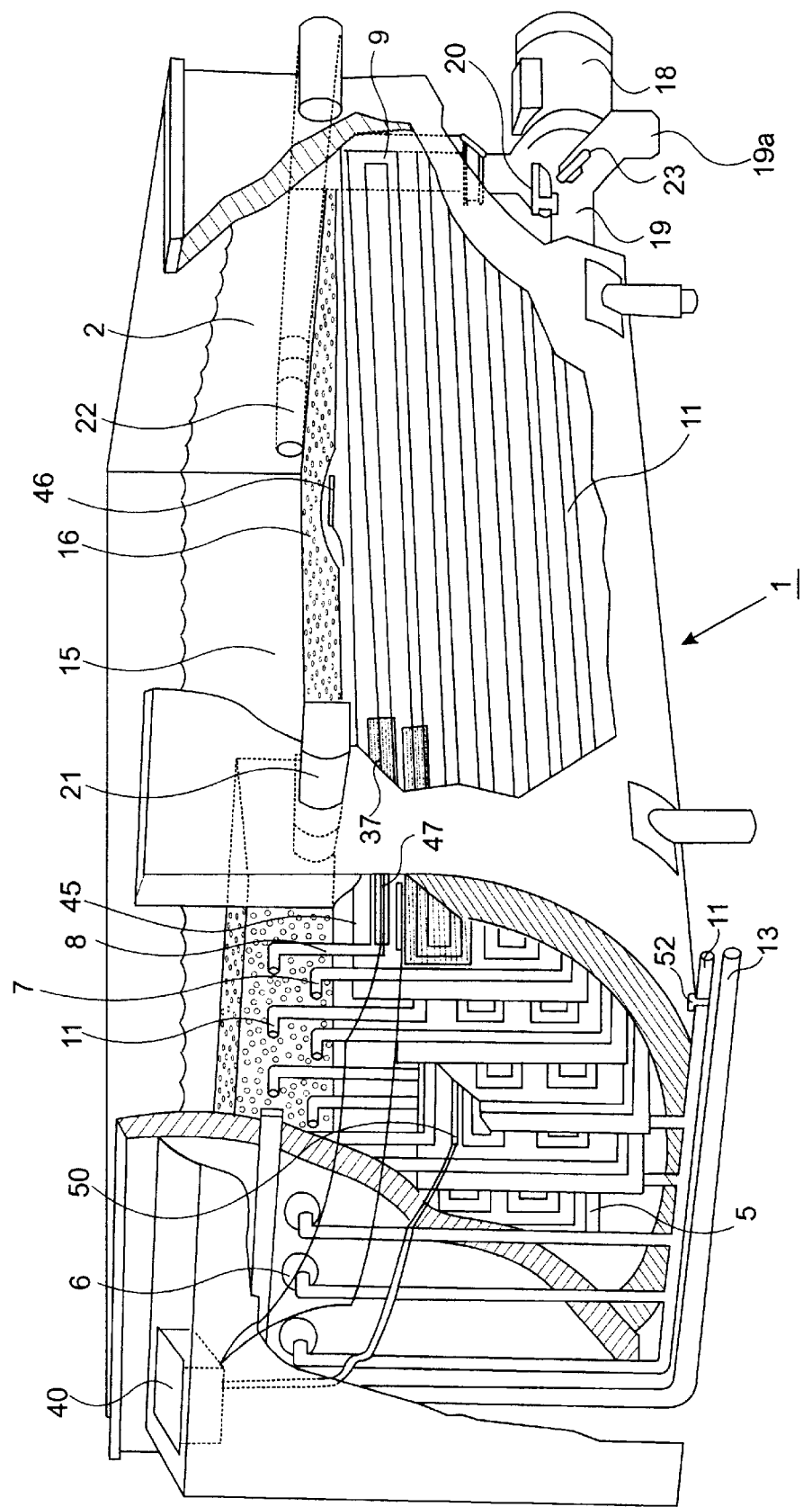
FIG. 1 illustrates a presently preferred embodiment of the quick chilling system of this invention having a plurality of plate coils in the chill tank, a product compartment formed with a removable tray and wherein chilling agent is circulated using a high volume pump.

Chilling agent temperature may vary (e.g., for water from a high of about 35° C. to a low of about 29° C., the water/ice chill tank of FIG. 1) in different parts of the chill tank, even when chilling agent is circulated. Positioning of product at different locations within the tank and at different locations with respect to the heat exchangers may be necessary if it is desired to chill a product to a selected temperature.

The heat exchanger of the device has a working surface, upon which the frozen chilling agent accumulates and a second heat-absorbing surface which remains free of frozen coolant. A substantial portion of the total surface of the heat exchanger preferably remains free of frozen chilling agent. In a preferred embodiment, more than 50% of the surface of the heat exchanger represents heat-absorbing surface that remains free of frozen chilling agent. In a preferred embodiment, the heat exchangers of the device of this invention are plate coils, in which a coil capable of carrying a flow of refrigerant to absorb heat from the surroundings is in close thermal contact with portions of the surface (the working surfaces) of the plate coil heat exchanger. Refrigerant coil can be integrally formed in the heat exchanger by bonding thermally conductive plates having aligned indentations together to form the refrigeration coil. The continuous coil traverses the front and back surfaces of the heat exchanger forming a serpentine pattern. The working surface is in direct thermal contact with and extends outward from the refrigerant coil a selected distance which depends upon the amount of frozen chilling agent that is desired. The cooling capacity of the chill tank can be increased by increasing the amount of (or thickness of) frozen chilling agent formed, so long as catastrophic freezing is avoided. The second heat-absorbing surface comprises the surfaces of the heat exchanger that are not within the limits of the working surface. These surfaces provide for substantial heat absorption from products added to the tank.

Refrigerant lines of the plate coil can remain substantially full of refrigerant during harvesting of frozen mass from the working surface.

The surfaces of the heat exchanger, at least those of the working surfaces, are desirably smooth. Metal working surfaces in particular are preferably smooth and shiny. The working surface, at least, can be made of a smooth or non-stick material such as electro polished stainless steel, or some other material having a comparably low bonding strength to the frozen chilling agent. Working surfaces preferably have no bumps or divots. The working surface can be provided with a coating, such as Teflon (trademark) or related materials to decrease frozen chilling agent adhesion. The heat-absorbing surfaces of the heat exchanger can be coated to enhance absorption of radiative heat energy, e.g. with a black absorbing layer.

The working surface is disposed in close or direct energy transfer thermal coupling with the refrigerant. "Close thermal coupling," as used herein, includes direct contact. It also includes convection through a moving fluid and/or a metal heat-conduction path in contact with the working surface or through radiation. The heat-absorbing surfaces are not in close thermal coupling with the refrigerant lines, they are indirectly coupled to refrigerant through the working surface. The extent of the working surface beyond the surface that is directly bonded to the refrigerant line is selected based on the desired thickness or amount of frozen chilling agent to be formed. In preferred embodiments, a temperature sensor, positioned adjacent to and at a selected distance (about 0.5 to 1.0 inch) from the working surface and which becomes encased in frozen chilling agent as frozen mass forms senses a minimum temperature indicating that a maximum frozen mass thickness has been achieved.

The refrigerant must be able to chill the working surface sufficiently to freeze the chilling agent. The thermally conductive layers desirably comprises stainless steel, chrome, aluminum, tin, or another material having similarly high resilience, thermal expansion, and/or thermal conductivity. It is presently believed that frozen mass harvesting is facilitated by differential expansion of the frozen mass and the plate coil. Harvesting may also in part be attributable to differential deformation of the thermally conductive layers of the heat exchanger which introduces mechanical stress in the layers to facilitate harvesting without damaging the layer. A presently-preferred thermally conductive layer comprises piecewise-planar or curved metal (particularly stainless steel) less than about 1 cm thick.

Control methods of the present invention can be implemented in software or hardware, as are known in the art. After either the frozen mass-building or frozen mass harvesting, methods of the present invention can feature optional "wait" steps, either for a fixed duration or until a predetermined criterion is satisfied.

In addition to temperature sensing, other techniques can be used to measure the mass of frozen coolant at the working surface. These include proximity sensors, optical sensors, RF sensors, sonic sensors, fluid electrical resistance sensors, and the like. U.S. Pat. No. 4,939,908 discloses an adjustable device for monitoring the apparent electrical resistance of the fluid to measure the size of an ice bank. One of ordinary skill in the art can readily adapt the device of this invention for use of various direct and indirect sensing mechanism without changing the character of the present invention.

The invention is further illustrated in the following description of the figures, where the same numbers represent like features.

FIG. 1 illustrates a preferred embodiment of the present invention. Chill tank 1 contains several plate coils 5 with refrigerant line 11 passing through each plate. In the device of FIG. 1 refrigerant enters each coil through an individual expansion valve 6 and exits into refrigerant return line 13. The plate coils are shown as positioned in the tank with front and back frozen mass-forming surfaces substantially parallel and vertical. The front and back surfaces of the plate coils comprise frozen-mass building surfaces (working surfaces 30) and surfaces that remain free of frozen mass during operation (heat-absorbing surfaces 35). A portion of the tank is partitioned from the plate coils to provide a chamber for receiving product to be chilled. In the device of FIG. 1, this product chamber 15 is formed by positioning a metal mesh plate 16 in the tank above the plate coils. Alternative orientation and positioning of the plate coils in the chill tank is possible.

Refrigerant line 11 traverses the plate coil in a serpentine pattern with the refrigerant entering at point 7 at the top of the plate. Refrigerant line 11 passes down to the bottom of the plate, traverses the plate multiple times at coil turns 9 (which may be rectilinear as shown or curved) from bottom to top. Refrigerant exits the plate at point 8 near the top of the plate coil.

In operation, tank 1 is filled with liquid chilling agent 2, which is preferably water and most preferably potable tap water. Chilling agent covers and surrounds plate coils 5 and substantially fills the product chamber 15. The partition provided in the tank (e.g., mesh 16) allows circulation of chilling agent from the portion of the tank in which the plate coils are positioned into the chilling chamber. A means for circulating chilling agent in the tank is provided. For example, a circulation system for chilling agent is provided. As illustrated, drain 19 near the bottom of tank 1, on opening valve 20 communicates with high volume pump 18 which in turn communicates with inlets 21 and 22 positioned in the portion of the tank reserved for receiving product to be chilled (in the upper portion of the tank). Chilling agent is circulated by pumping it through drain 19 and valve 20 through appropriate conduits to inlets 21 and 22. Chilling agent can be drained from tank 1 through drain outlet 19a, for example to facilitate cleaning, by opening valve 23 at drain 19.

Figure 2A:
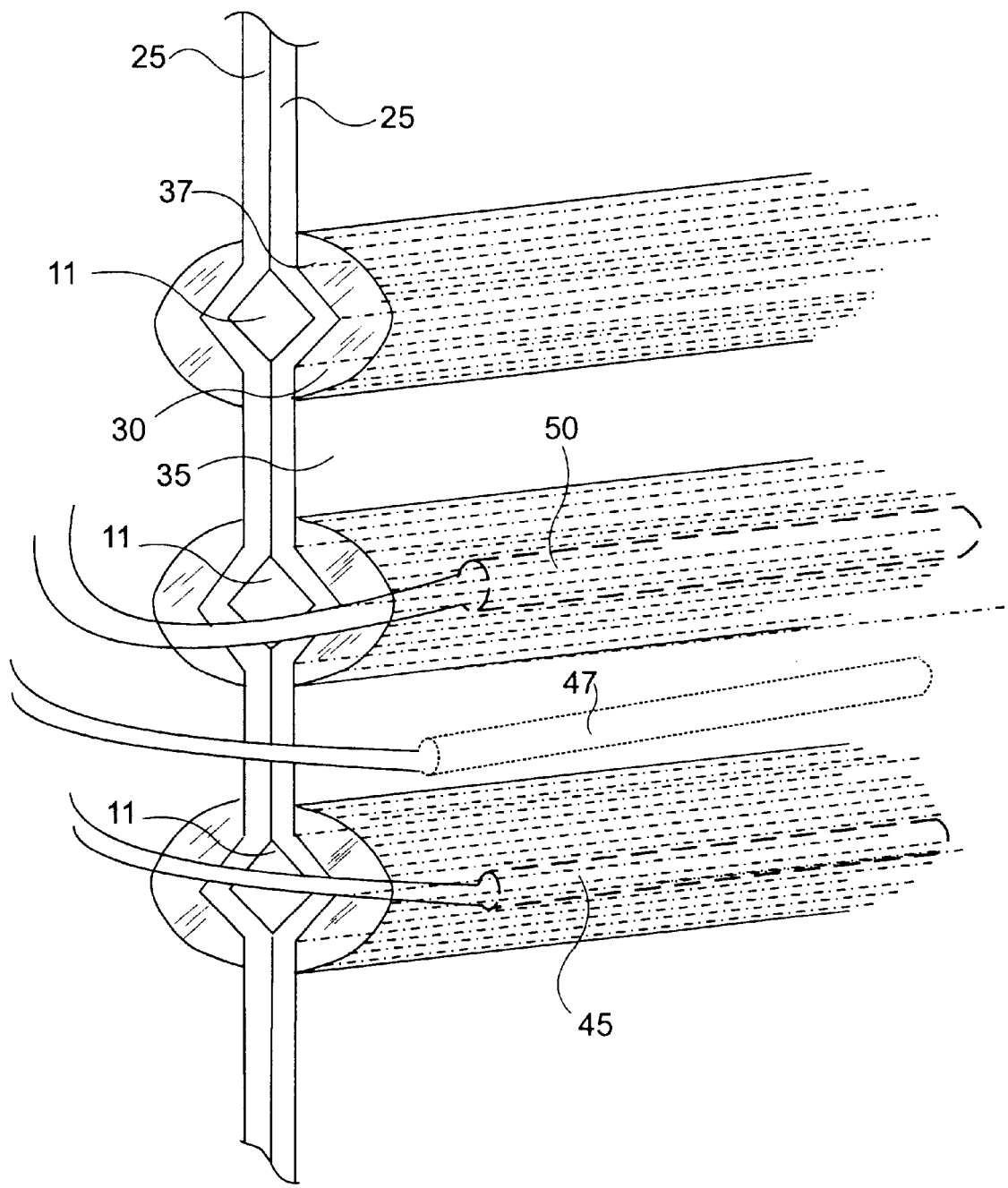
FIGS. 2A–E illustrate exemplary heat exchanger plate coils of this invention.
Figure 2B:
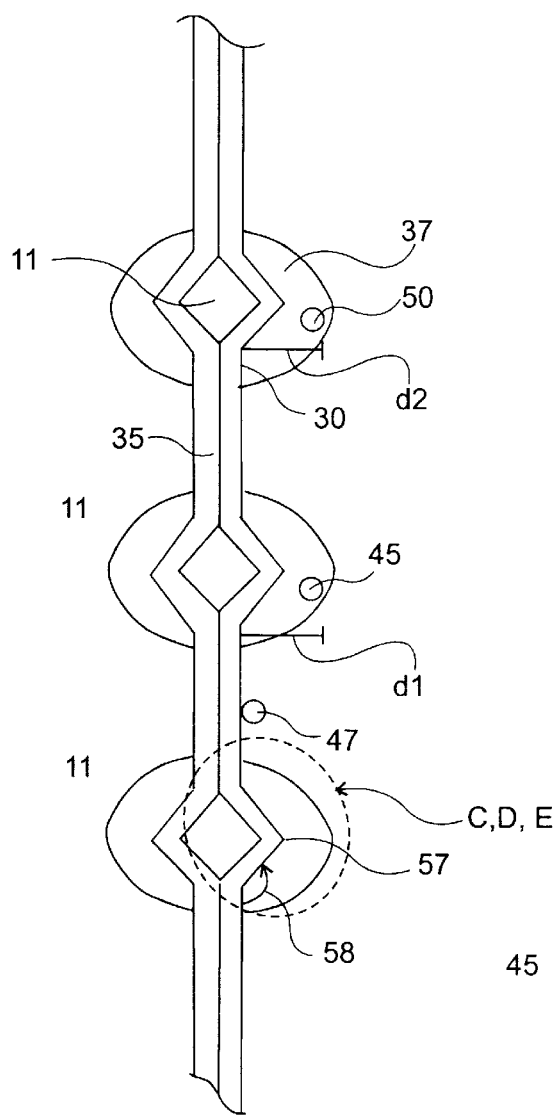

FIGS. 2A and 2B illustrate in more detail a portion of an exemplary plate coil 8 of this invention. FIG. 2A is a perspective view of the plate coil surfaces with cut-away end. The illustrated plate coil has front and back heat-conductive surfaces 25 and a refrigerant line 11 traversing the area of the plate. One or more portions of refrigerant line 11 are in thermal contact with the heat-conductive surfaces of the plate coil. In a specific embodiment shown, the heat conductive layers 25 of the plate coil are metal plates, specifically stainless steel plates, selectively shaped by pressure molding to form a conduit 11 that functions as the refrigerant line and that traverses the area of the plate. The three conduit portions 11 illustrated in FIG. 2A are in fluid communication, as shown in FIG. 1, and refrigerant flows from the lower conduit to the upper conduit.

In operation, when refrigerant is supplied to each plate coil through expansion valves 6, it absorbs heat, cooling the heat conductive surface of the plate in contact with chilling agent and building a frozen mass of chilling agent on portions of the plate coil in the vicinity of the refrigerant lines. The surface upon which frozen chilling agent builds is designated the working surface 30. The heat-conductive surfaces of the plate coil 25 comprise working surfaces 30 proximal to the refrigerant coil and heat-absorbing surfaces 35 upon which little or no chilling agent is allowed to freeze. The heat-absorbing surfaces of the illustrated plate coil are distal to the refrigerant lines between the working surfaces and near the outside edges of the plate coil (not specifically shown). Heat-absorbing surfaces are preferably distributed over the entire plate surface, in a pattern determined by the pattern of working surfaces proximal to the refrigerant lines of the plate coil. The refrigerant line pattern illustrated in FIG. 1 is rectilinear, with a continuous refrigerant line making multiple traverses of the plate (in a serpentine pattern) appropriate for coverage of the rectangular surface of the illustrated plate coil. Plate coils of other sizes and shapes and with different patterns of refrigerant lines can be readily adapted for use in the device of this invention. For example plate coils can be formed into tubes in which refrigerant lines coil around the circumference of the tube.

The thickness and width of frozen mass (37) on the plate coil in the vicinity of the refrigerant line is controlled by selective introduction of refrigerant to line 11 and as a result the extent of the working surface is also controlled by selective introduction of refrigerant. For proper operation of the system, a portion of the plate coil surface must remain free of frozen mass to allow efficient heat absorption from hot or warm product introduced into the chill tank. In a specific embodiment of the device illustrated in FIG. 1, in typical operation for chilling bags of cooked food product, the width of the frozen mass and the working surfaces centered at the refrigerant line is controlled as described below to be about 4 inches and the width of the heat-absorbing surfaces between the working surfaces is about 12 inches wide.

The plate coils are positioned with respect to each other to maximize available working surfaces, to allow sufficient space for frozen mass building on the working surfaces, for harvesting of frozen chilling agent from the working surfaces and to allow efficient circulation of chilling agent between plate coils. In specific embodiments, plate coils can be positioned in the chill tank so that product can be positioned between, adjacent to, above or below the plate coils.

It is desirable to have uniform frozen mass building in the devices of this invention and to avoid the development of cold spots in the tank which may lead to catastrophic freezing. In a device as illustrated in FIG. 1 with multiple plate coils supplied from a single refrigerant source, it may be necessary to adjust refrigerant supply to the individual plate coils to insure that cooling and frozen mass building is substantially uniform in the chill tank. In the device of FIG. 1, individual refrigerant expansion valves are provided to allow refrigerant supply to individual plate coils to be adjusted.

Three sensors are illustrated on the plate coil portions of FIGS. 2A and 2B. Temperature sensor 45 is positioned at a selected distance d1 away from a working surface of a plate coil. Temperature sensor 47 is positioned at a heat-absorbing surface of a plate coil (preferably the same plate coil where sensor 45 is positioned). When refrigerant is introduced into the plate coils, frozen mass builds on the working surface, extending at least a distance d1 from the working surface to encase the temperature sensor in frozen mass. As frozen mass grows temperature at sensor 45 decreases and the temperature change is related to the thickness of frozen mass growing. In a given device, sensor 45 can be electrically coupled to a control (40, FIG. 1) to provide an electronic signal to stop the flow of refrigerant to the coils when a selected temperature (associated with a selected thickness of frozen mass) is reached at the working surface. This temperature is the lower set point for refrigerant control. The supply of refrigerant in the device is controlled so that the frozen mass does not exceed a selected maximum thickness and to ensure that sufficient heat-absorbing surfaces are maintained on the plate coil. When the temperature at sensor 45 increases to an upper set point selected by the operator the refrigerant can be restarted to provide additional chilling. While an increase in temperature at sensor 45 is indicative of frozen mass harvesting from the working surface, harvesting need not be complete for refrigerant to be restarted. Harvesting can occur or be completed when refrigerant is passing through the plate coil. In typical operation, refrigerant flow is controlled by setting an upper and a lower temperature set point on sensor 45, that provides for sufficient cooling capacity and chilling speed in a given application. Temperature sensor 45 preferably has temperature resolution of about 0.1 degree F. The temperature of sensor 45 can, for example, be set at the temperature that indicated complete harvesting of the frozen mass from the working surface. Thus, a single temperature sensor, set to turn off refrigerant when the temperature reaches the low temperature set point and set to restart refrigerant when the temperature reaches the high temperature set point, can be used to control chill tank refrigeration/harvesting cycles. Other temperature sensors can be positioned within the tank, e.g., 46 (FIG. 1).

Alternatively, the chilling device can be provided with a control system (40) which monitors and compares the temperatures of sensors 45 and a second temperature sensor 47, which is positioned on a heat-absorbing surface of the heat exchanger. As actuated by electronic signals from the control system, refrigerant is stopped when the temperature of temperature sensor 45 reaches a low set point indicative of maximum thickness of frozen mass and refrigerant is restarted when the temperature of sensors 45 and 47 equalize (within about 0.1 to 0.5° C.) indicative of harvesting to allow build up of additional frozen mass at the working surface.

The device of FIG. 1 is coupled to a source of refrigerant into refrigerant line 11 with return through line 13. The source of refrigerant, for example a conventional compression refrigeration unit, is preferably remote from the chilling tank to minimize device floor space requirements, and minimize noise and heat generation near the chilling tank. Any conventional source of refrigerant can be employed and is not therefor described in detail herein.

In operation, with water as the chilling agent being circulated through the chill tank, refrigerant flows, for example refrigerant 404A, through plate coils 8, cools the water in the tank and builds ice on the working surfaces. When ice builds to a set thickness, which maintains a heat-absorbing surface on the plate coil, the flow of refrigerant is stopped. Products to be chilled are introduced into the tank in contact with the chilled water (or chilling water). If ice is present when warm (or hot) products are inserted into the tank, heat is transferred from the products to the heat absorbing surfaces of the plate coil and to the working surface to facilitate ice harvesting. It is believed that heat is transferred via radiative processes, conduction and/or convection from the products to the heat-absorbing (ice-free) surfaces of the plate coil to weaken the bond of the ice with the working surface.

Ice-release is facilitated by the presence of heat-absorbing surfaces on the plate coils. Several mechanisms of ice harvest may operate. Heat transfer to the plate coil may melt ice at the working surface to facilitate harvest. In addition or alternatively, differential expansion of the working surface, which is metal, and the ice can function to release ice. In addition or alternatively, differential heat absorption by the heat-absorbing portions of the heat conductive layers of the plate coil can introduce mechanical stress into the plate coil, which facilitates ice release. One or more of these mechanisms or other mechanisms as yet unappreciated may operate in the device of this invention.

Refrigerant flows until the maximum desired ice thickness builds up. Once ice building has maximized, refrigerant flow is stopped until a set upper temperature is reached at a sensor or until ice is harvested. Products to be chilled can be inserted into the chilling tank at any time the chilling unit is turned on. Ice harvesting by heat transfer from inserted products can occur while refrigerant is flowing or when the refrigerant flow has been stopped because of ice build up. Once ice has been harvested and until product is cooled to desired temperature, the chilling agent and product are in thermal contact with the refrigerant undergoing phase change until ice has reached its harvest thickness. During this period, cooling efficiency is greatly enhanced.

Because of its latent heat of fusion, frozen mass formed on the plate coils functions as a readily available "heat sink" to provide for thermal energy storage (cool storage) to absorb heat from its surroundings. The harvesting of frozen mass and the subsequent melting of the frozen mass rapidly absorbs heat from the surroundings resulting in quick chilling of product. The frozen mass (ice) heat sink provides immediate chilling capacity to avoid significant temperature fluctuations of the chilling agent and minimize refrigerant usage (and thereby minimizes energy costs) for chilling product.

FIGS. 2A and B also illustrates optional, but preferred safety features. Chilling devices that employ water are vulnerable to control system failures that cause excessively long freeze cycles, because water expands on freezing and excessive ice production may damage components or rupture the tank. The device can be provided with redundant protection against catastrophic freezing, for example, in the form of an override switch responsive to a capillary tube pressure sensor 50 which can close refrigerant inlet valve 52 (e.g., a solenoid valve). The capillary tube sensor is a mechanical sensor that preferably operates without electrical power. It is shown in FIGS. 2A and B as positioned at a selected distance d2 from the working surface. The sensor is preferably totally isolated from the normal mechanical and electrical controls of the device so that failure of the devices systems will not necessarily cause failure of the sensor. The capillary tube sensor contains a gas in a metal tube, typically a copper tube. The copper tube contracts on cooling decreasing the gas volume and when the temperature is below a desired minimum, for example, when the tube is covered with ice. A diaphragm connected to the sensor is compressed when the frozen solution expands to acuate a switch which stops the flow of refrigerant.

Figure 2C:
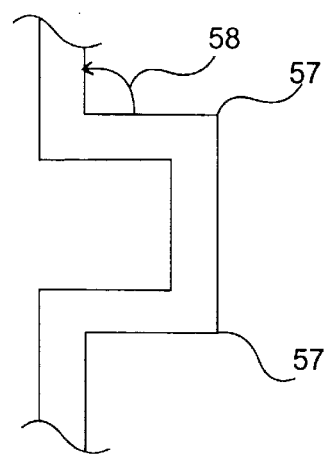
Figure 2D:
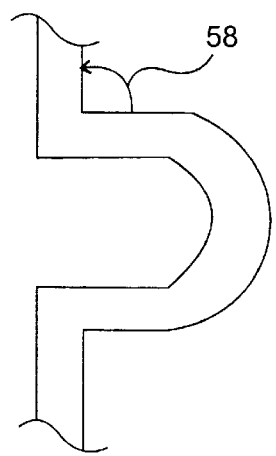
Figure 2E:
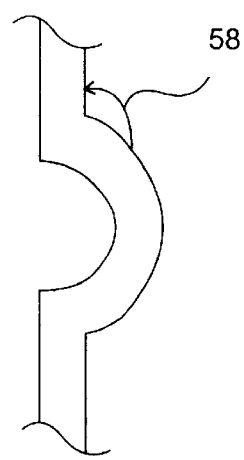

In the plate coil illustrated in FIGS. 2A and 2B, the refrigerant line 11 is integrally formed in the plate coil as a rectilinear tube with straight walls and sharp edges 57 protruding at the working surface and forming a portion of that surface. The refrigerant line can be formed with different shapes protruding from the heat conductive surface into the tank containing chilling agent. The protruding surface of the line may be slanted (FIG. 2B), composed of flat horizontal and vertical surfaces (FIG. 2C), rounded (FIG. 2D or FIG. 2E) or semi-circular. The protruding surface of the line can make an angle (58) of 90° (FIG. 2D) or an angle of greater than 90° (FIG. 2E) with the flat surface of the plate coil.

Figure 3:
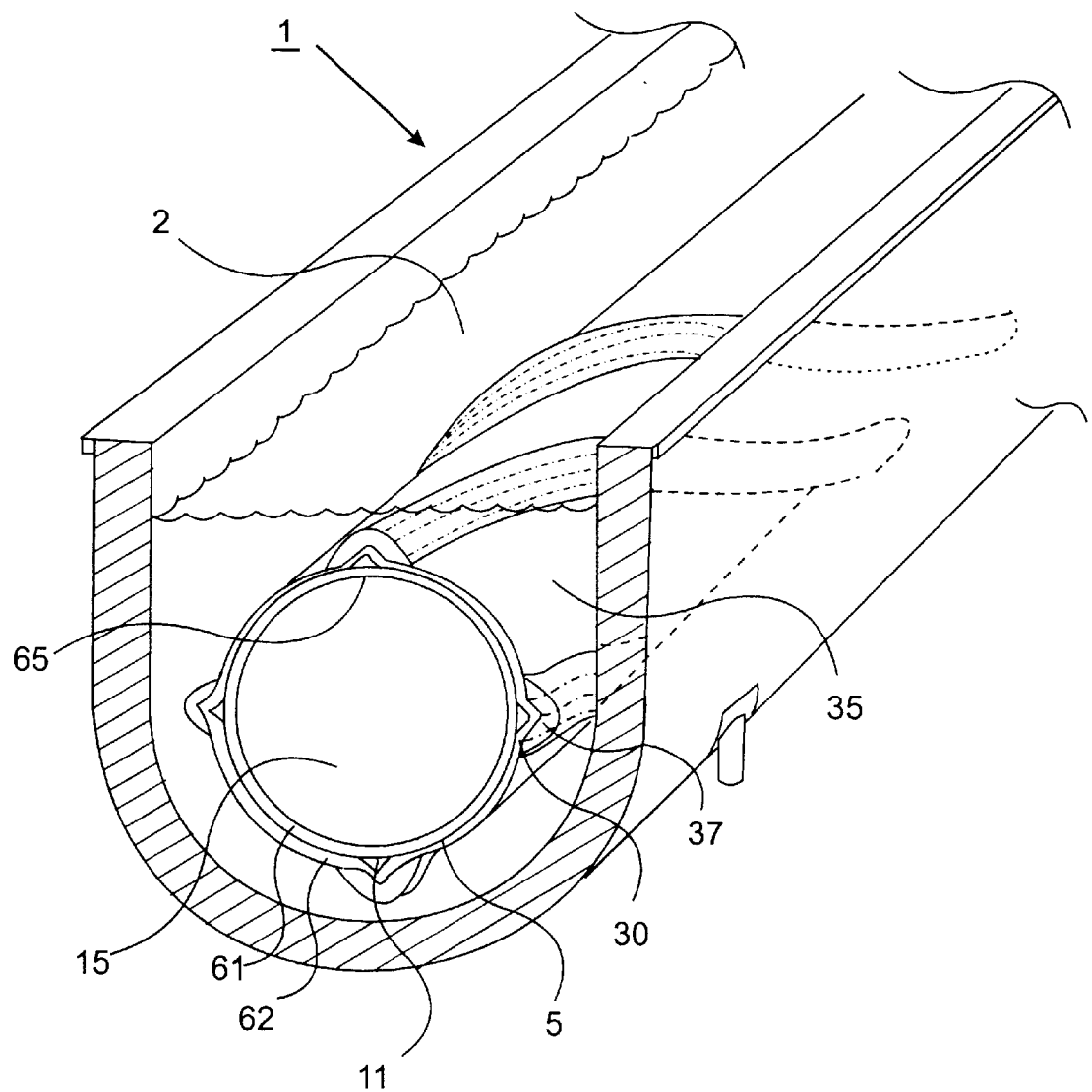
FIG. 3 illustrates an alternative heat exchanger of the device of this invention in which the heat exchanger forms a product vessel.

FIG. 3 illustrates an alternative heat exchanger for use in the chilling device of this invention. A tubal heat exchanger 8 is positioned in chill tank 1 submerged in chilling agent 2. In this case, the heat exchanger two heat conductive surfaces, an inside conductive surface 61 and an outside conductive surface 62. The heat exchanger forms the compartment in the chill tank for receiving product 15. Refrigerant lines 11 coil or spiral around the tube. In this embodiment, refrigerant lines preferably do not protrude at the inside surface into the tube. Frozen mass is built only on the outside surface of the tube. Working surfaces 30 spiral around the tube following the pattern of the refrigerant lines. Heat-absorbing surfaces 35 spiral around the tube between the working surfaces extending to the inside conductive surface in thermal and radiative contact with the product. To avoid freezing of product passing through the tube, thermal insulation can be provided 65 at the inside wall of the tube proximal to the refrigerant lines and may extend the width of the working surface.

In operation, refrigerant is passed through lines 11 to chill surfaces 61 and 62, chilling agent 2, any product present in the tube and ultimately to form frozen chilling agent on the outside working surface of the tubular heat exchanger. Refrigerant is allowed to flow through lines 11 until a desired maximum thickness of frozen chilling agent is formed on the working surfaces. After refrigerant is stopped, product passing in the tube is chilled by melting stored frozen chilling agent, any slush present or by chilled water. When the temperature at the heat exchanger reaches a selected maximum temperature or when frozen mass is harvested, refrigerant flow is restarted.

Product can be flowed or otherwise impelled through the product tube and may be a liquid, semi-liquid or of a any consistency that can be pumped or impelled. Product may consist of objects carried in a liquid flow, e.g., object carried in a flow of water. Product may be continuously flowed through the tube and through a selected length of heat exchanger while chilling or introduced in batches for a selected chilling time.

The chill tank of FIG. 3 is illustrated as a trough through which the tube extends. The product tube may extend on either side of the tough to receive hot or warm product from a source (e.g., a cooker or like heating device) and deliver appropriately chilled product for storage, packaging, canning, bottling or further processing. Only the portion of the tube that is submerged in chilling agent is provided with refrigerant lines, thus only a portion of a given product tube may be the heat exchanger. The length of the heat exchanger portion of the tube is selected to provide the desired chilling of the product and will depend upon the product, the rate of passage through the tube, the refrigerant and chilling agent used and other device variables. The chill tank can be supported on the ground with legs as illustrated or may be suspended from the ceiling with appropriate supports.

In an alternate embodiment of FIG. 3, the chill tank itself can be formed into a closed-end tube with appropriate supply and drainage lines for adding and circulating chilling agent around the tubular heat exchanger.

The device of FIG. 3 is illustrated with a single tubular heat exchanger. Devices of this invention may have multiple tubular heat exchangers within a chill tank.

The tubular heat exchanger of FIG. 3 can be equipped with chilling agent circulation systems and temperature sensors as described for the example of FIG. 1. In specific embodiments, employing the tubular heat exchanger/ product vessel of FIG. 3, product may be continuously pumped or otherwise impelled through the tube. In this case, additional control mechanisms may be provided to detect product pump failure to avoid catastrophic freezing.

In another alternative configuration, the heat exchanger can be formed as a tube as in FIG. 3, but wherein the tube carries chilling agent, and the refrigeration lines of the heat exchanger and its working surface are on the inside of the tube. The outside surface of the tube is then in contact with the product to be chilled, for example the tube may be submerged in or pass through a container carrying the product. The outside surface of the tube is optionally provided with insulation extending proximal to the refrigerant line or extending over the entire working surface. The heat absorbing surfaces are formed on both the inside and outside surfaces of the tube.

The chilling tank is preferably made of stainless steel or other readily cleanable material suitable for water and ice storage. The chilling tank is desirably insulated sufficiently so that at least half of the volume of frozen coolant harvested in a single cycle will remain frozen for at least 24 hours under minimum load conditions—i.e., with any added product promptly removed, with a closed tank, and without agitation. In most cases, this condition will be met if the tank is closed and coated with a conventional foam, fiberglass, or other insulator with a similarly high R value to provide the minimum acceptable thermoconductivity. The tank can optionally be fitted with an insulated lid. The tank can rest directly on the floor preferably with a layer of intervening insulation or the tank can be supported off the floor with a plurality of legs.

In the art of chilling devices and ice builders, the term "water" sometimes refers generically to water-based coolants, including those that contain rust inhibitors or additives to alter freezing characteristics. These sometimes-toxic additives are not conventional or appropriate for use in chilling food or medical products and the term "water" as used herein does not refer to water containing additives unsuitable for use in food or medical applications. Water used as the chilling agent is this invention can simply be the tap water available at any given site, however it is preferred that the water be potable. Dependent upon water quality, purification systems or water softening systems may be employed to facilitate cleaning and minimize deposition (e.g., minimize hard water deposits). Distilled or filtered water may be employed, but is not required. Non-toxic additives can be employed to facilitate cleaning or to inhibit mildew, mold, fungus or bacterial growth. For example, the water can be chlorinated to inhibit grow of undesirable organisms. Non-toxic additives that affect freezing point of the water can be added, e.g., propylene glycol, but are not required. The thermal properties of water are generally suitable and in fact are generally preferred for use in the chilling device of this invention for applications to the quick chilling of food or medical products.

The specific embodiments described herein are illustrative of the invention and are not intended to limit the invention. Those of ordinary skill in the art will appreciate that materials, structures, and device elements other than those specifically described in the illustrated embodiments can be employed in the practice of this invention without departing from its spirit and scope. For example, the present invention has referred generally to the use of a refrigeration system, unit or plant and has specifically referred to refrigeration systems that function by expansion, compression and condensation of refrigerants. Other refrigeration systems which function by other mechanisms are known in the art and can be readily adapted for use in the present invention by those of ordinary skill in the art without undue experimentation. Those of ordinary skill in the art are aware of various functional equivalents of materials, structures and device elements specifically described herein that can be employed or readily adapted to the practice of this invention. All such functional equivalents are intended to be encompassed within the scope of this invention.

I claim:

1. A device for chilling a product comprising:
   (a) a tank which contains a freezable chilling agent for receiving the product to be chilled;
   (b) a source of refrigerant;
   (c) one or more thermally-conductive layers in the tank which are in contact with the freezable chilling agent and which have a working surface thermally coupled with the refrigerant source and a heat-absorbing surface thermally coupled with the working surface, wherein selective introduction of a flow of refrigerant closely thermally coupled with the working surface chills the working surface, the chilling agent in the tank and any product in said tank and permits chilling agent to freeze onto the working surface and wherein the refrigerant source, the working surface and the heat-absorbing surface are arranged with respect to each other and the refrigerant is selectively applied so that chilling agent does not freeze to the heat-absorbing surface.

2. The device of claim 1 wherein said refrigerant source comprises a refrigerant line through which a flow of refrigerant can be selectively introduced in close thermal coupling with the working surface of the thermally-conductive layer in the tank.

3. The device of claim 2 wherein said thermally-conductive layer is a plate coil having refrigerant line in close thermal contact with a portion of the surface of the coil portion of the surface constituting the working surface.

4. The device of claim 3 wherein the refrigerant line is integral with the plate coil.

5. The device of claim 1 wherein the chilling agent is water.

6. The device of claim 1 wherein heat released from product introduced into the tank facilitates harvesting of frozen chilling agent from the working surface.

7. The device of claim 1 further comprising a control system for selective introduction of a flow of refrigerant in contact with the working surface which comprises a sensor responsive to the thickness of the frozen chilling agent and responsive to harvesting of the frozen chilling agent from the working surface wherein the flow of refrigerant is stopped when a maximum thickness of chilling agent is formed and restarted when frozen chilling agent is harvested.

8. The device of claim 1 further comprising a control system for selective introduction of a flow of refrigerant in contact with the working surface which comprises a sensor responsive to selected lower and upper temperature set points for stopping and restarting, respectively the flow of refrigerant.

9. The device of claim 1 wherein the source of refrigerant is a remote refrigeration unit and the control system further comprises a switch which controls said remote refrigeration unit and wherein the sensor provides an electronic signal to turn off the remote refrigeration unit when a maximum thickness of chilling agent is formed.

10. The device of claim 1 further comprising an emergency control system to prevent catastrophic freezing of the device which comprises a mechanical operative capillary tube sensor in contact with the thermally conductive layer in the tank the sensor responsive to a selected minimum temperature or responsive to a maximum thickness of frozen chilling agent to actuate a switch to stop the flow of refrigerant to the device.

11. The device of claim 1 wherein the thermally-conductive layers are a plurality of plate coils each having a serpentine refrigerant line traversing the plate coil wherein the working surface is the plate coil surface proximal to the refrigerant line.

12. The device of claim 11 wherein the plate coils are aligned with working surfaces vertically aligned.

13. The device of claim 11 wherein the heat-absorbing surface represents 50% or more of the surface of the plate coils.

14. The device of claim 1 further comprising a product vessel wherein the thermally-conductive layers form a portion of the product vessel.

15. A device for chilling a product consisting essentially of:
   (a) a tank containing a freezable chilling agent for receiving the product;
   (b) a source of refrigerant;
   (c) one or more thermally-conductive layers in the tank having a working surface thermally coupled with the refrigerant source and a heat-absorbing surface thermally coupled with the working surface, wherein selective introduction of a flow of refrigerant thermally coupled with the working surface chills the working surface, the chilling agent in the tank, and any product in the tank and permits chilling agent to freeze onto the working surface and wherein the refrigerant source, the working surface and the heat-absorbing surface are arranged with respect to each other and the refrigerant is selectively applied so that chilling agent does not freeze to the heat-absorbing surface.

16. The device of claim 15 wherein the source of refrigerant is a remote refrigeration unit having refrigerant supply and refrigerant return lines coupled to said device.

17. A method for chilling a product which comprises the steps of:
  (a) providing a tank containing a freezable chilling agent for receiving said product to be chilled;
  (b) providing a source of refrigerant;
  (c) providing one or more thermally-conductive layers in the tank having a working surface thermally coupled with the refrigerant source and a heat-absorbing surface thermally coupled with the working surface,
  (d) selectively controlling the flow of refrigerant thermally coupled with the working surface to chill the working surface, the chilling agent in the tank and any product in the tank and permitting chilling agent to freeze onto the working surface, but to avoid the formation of frozen chilling agent on the heat-absorbing surface;
  (e) introducing the product into the tank in contact with the chilling agent in such a way that heat is released from the product to facilitate harvesting of frozen chilling agent from the working surface.

18. Method of claim 13 wherein the chilling agent is water.

19. A device for chilling a product which comprises:
  (a) a tank which contains a freezable chilling agent;
  (b) a product vessel positioned in the tank and having an outside surface in contact with freezable chilling agent and an inside surface in contact with product wherein a portion of the product vessel forms one or more thermally-conductive layers in the tank wherein a working surface is formed on at least a portion of the outside surface of the product vessel and a heat-absorbing surface is formed on at least a portion of the inside surface of the product vessel and wherein the working surface is thermally coupled to the heat-absorbing surface;
  (c) a source of refrigerant thermally coupled to the working surface;
wherein selective introduction of a flow of refrigerant closely thermally coupled with the working surface chills the working surface, the chilling agent in the tank and product in the product vessel and permits chilling agent to freeze onto the working surface.

20. The device of claim 19 wherein the product vessel is a tube.

21. The device of claim 1 wherein the harvesting of chilling agent frozen from the working surface is facilitated by differential expansion of the thermally conductive layers.

* * * * *

UNITED STATES PATENT AND TRADEMARK OFFICE
CERTIFICATE OF CORRECTION

PATENT NO. : 6,216,469 B1
DATED : April 17, 2001
INVENTOR(S) : Miller

Page 1 of 1

It is certified that error appears in the above-identified patent and that said Letters Patent is hereby corrected as shown below:

Column 1,
Line 53, please replace "mechanically" with -- mechanical --.

Column 2,
Line 41, please delete "," after "preferred".

Column 5,
Line 4, please replace "with a" with -- with an --.

Column 8,
Line 8, please replace "35° C" with -- 35° F -- and replace "29° C" with -- 29° F --.

Column 14,
Line 7, please replace "of a any" with -- of any --.

Signed and Sealed this

Twenty-fifth Day of December, 2001

Attest:

JAMES E. ROGAN
*Attesting Officer*  *Director of the United States Patent and Trademark Office*